ized Patent [19]

United States Patent [19]

Kuenzel et al.

[11] Patent Number: 4,958,749
[45] Date of Patent: Sep. 25, 1990

[54] APPLIANCE FOR SIMULTANEOUSLY DISPENSING BOTH FREE-FLOWING AND POURABLE SUBSTANCES

[75] Inventors: Werner Kuenzel, Langenfeld; Peter Vierkoetter, Leverkusen, both of Fed. Rep. of Germany

[73] Assignee: Henkel Kommanditgesellschaft auf Aktien, Duesseldorf, Fed. Rep. of Germany

[21] Appl. No.: 254,909

[22] Filed: Oct. 7, 1988

[30] Foreign Application Priority Data

Oct. 9, 1987 [DE] Fed. Rep. of Germany ....... 3734132

[51] Int. Cl.$^5$ .............................................. A47G 19/30
[52] U.S. Cl. .................................. 222/133; 222/142.5; 222/142.6; 222/431; 222/454; 222/481; 222/484; 222/485
[58] Field of Search ............... 222/129, 133, 454, 456, 222/457, 142.5, 142.9, 450–452, 431, 478, 481, 482, 484, 485, 54 B, 142.1, 142.6, 142.7, 480; 220/253

[56] References Cited

U.S. PATENT DOCUMENTS 2,438,906  4/1948  Elsas et al. ...................... 222/129 X
4,750,644  6/1988  Kolody ............................ 222/484 X

FOREIGN PATENT DOCUMENTS 8214974  8/1982  Fed. Rep. of Germany .
8336653  3/1984  Fed. Rep. of Germany .

Primary Examiner—Joseph J. Rolla
Assistant Examiner—David H. Bollinger
Attorney, Agent, or Firm—Ernest G. Szoke; Wayne C. Jaeschke

[57] ABSTRACT

A dispenser includes a first receptacle enclosing a second receptacle, for storing and providing substantially simultaneous dispensing of free-flowing and pourable substances, respectively. A dosing element is included in the second receptacle for limiting to a predetermined amount or dose the amount of pourable substance dispensed in each dispensing cycle.

7 Claims, 5 Drawing Sheets

APPLIANCE FOR SIMULTANEOUSLY DISPENSING BOTH FREE-FLOWING AND POURABLE SUBSTANCES

BACKGROUND

1. Field of the Invention

This invention generally relates to dispensers, and more particularly to appliances including receptacles for storing and dispensing at least one free-flowing substance and one pourable substance.

2. Discussion of Related Art

Products which have to be prepared from at least two components for use as directed are known. Such products include those from a liquid substance and a pourable substance (for example liquid detergents to which powder-form bleaches are to be added).

Appliances for storing and dispensing such substances are known. Before dispensing, the receptacle for the pourable substance is destroyed with the effect that the pourable substance empties into the liquid. The product so mixed is then taken from the storage container (for example, see German patent Nos. G8336653.9 and G8214974.7). The disadvantage of these appliances is that they can only be used once because the product has to be used immediately after mixing.

SUMMARY OF THE INVENTION

Accordingly, one object of the invention is to provide an appliance in which free-flowing and pourable substances are stored together in separate containers, in a manner enabling both substances to be repeatedly dispensed in dosed composition or predetermined ratios without any additional aids.

The one object is achieved in accordance with the invention by equipping the receptacle for the pourable substance with a dosing element.

The invention provides both for the simultaneous, separate storage of at least one free-flowing and one pourable substance, and for repeated dispensing of the substances in exactly dosed composition.

In one embodiment of the invention, the receptacle with the dosing element is designed for insertion into the receptacle for the free-flowing substance, making the appliance easier to refill.

In another embodiment, the receptacle with the dosing element consists of two compartments separated from one another by a partition designed to be locally opened. In this embodiment, one compartment serves as a reservoir and the other as a pouring channel for the pourable substance.

In one particularly advantageous embodiment of the invention, the compartment which holds the pourable substance comprises a base which slopes downwards towards the partition and/or the other compartment, the latter serving as a pouring channel comprising a region which extends to beneath the base of the compartment for the pourable substance. When the partition is open, a predetermined quantity of the pourable substance trickles over the sloping base of one compartment into the other compartment.

In another embodiment of the invention, the compartment serving as a pouring channel is cylindrical in shape, the opening in the partition being closeable by a rotatable tube which is inserted into the cylindrical compartment, and which is in the form of a half-tube in the region of the opening. The opening is released or closed, depending on the position of the tube.

In a preferred embodiment of the invention, the tube is integrated into a cover, the cover being provided with a pouring opening for the free-flowing substance and with a pouring opening for the pourable substance. In this embodiment, the cover can be turned for selectively opening or closing off the pouring openings. Depending on the position of the cover, the opening between the two compartments of the receptacle for the pourable substance and the pouring opening of the tube, and also the pouring opening of the receptacle for the free-flowing substance, are simultaneously released or closed.

BRIEF DESCRIPTION OF THE DRAWINGS

The invention is described by way of example in the following with reference to the accompanying drawings, in which like items are identified by the same reference number, wherein.

DETAILED DESCRIPTION OF THE INVENTION

Figure 1:
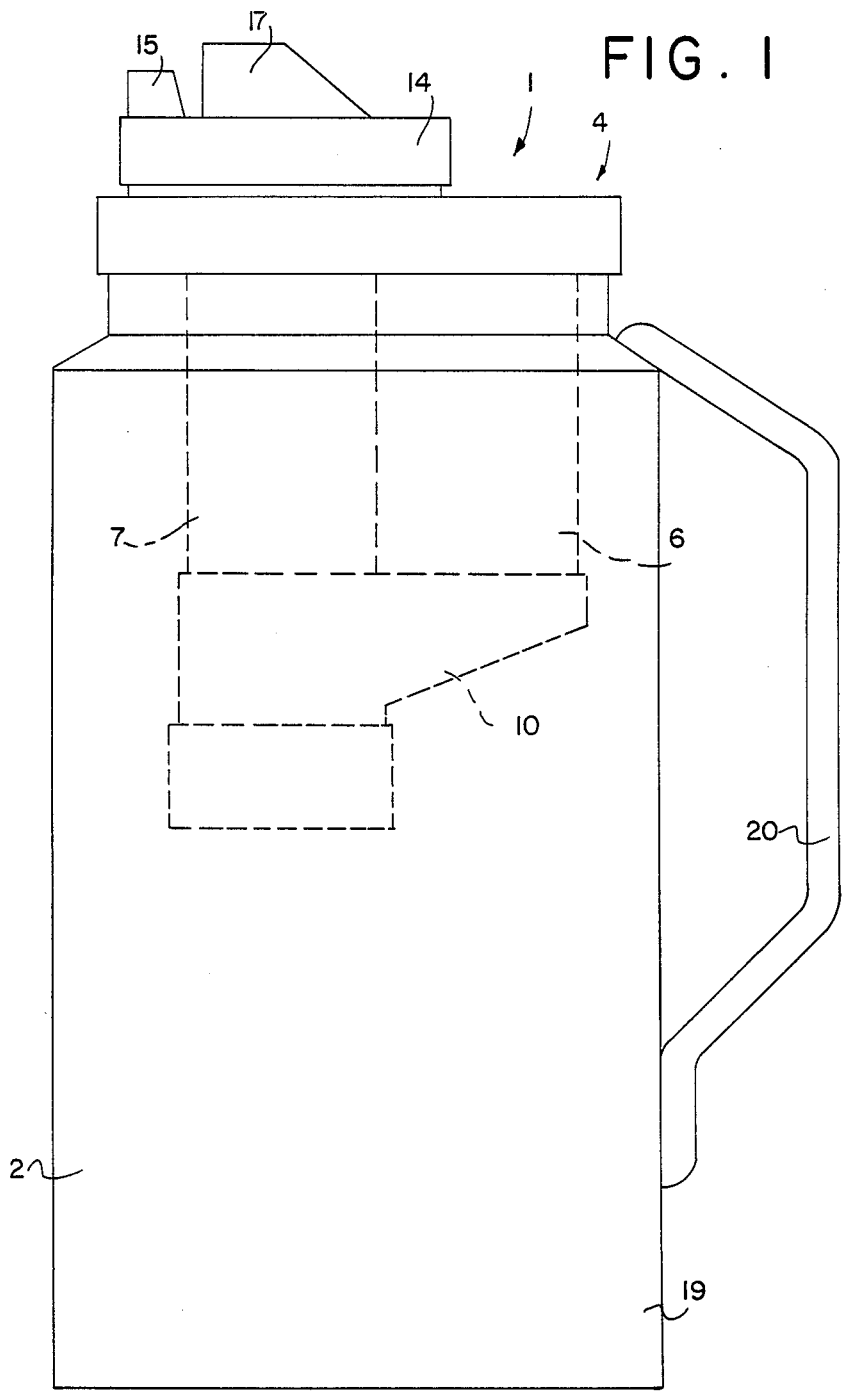
FIG. 1 is an elevational view of a side of an appliance of one embodiment of the invention with the cover in the open position.
Figure 2:
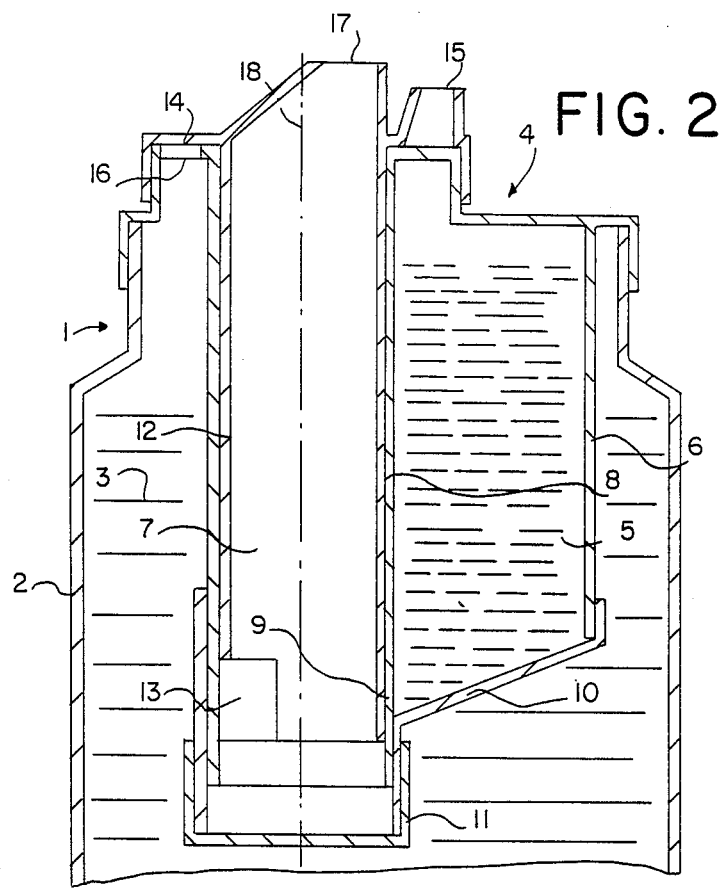
FIG. 2 is a sectional view through the same embodiment as in FIG. 1, but with the cover rotated 180° to the closed position.

An appliance 1, according to one example of an embodiment of the invention, comprises a receptacle 2 for a liquid substance 3 (see FIGS. 1 and 2). The receptacle 4 consists of a compartment 6 serving as a reservoir for the pourable substance 5 and of a compartment 7 serving as a pouring channel, the two compartments 6 and 7 communicating with one another through a closeable opening 9 in a common partition 8. The compartment 6 comprises a base 10 which slopes downwards towards the opening 9. Beneath the opening 9 and the sloping base 10, there is a base region 11 of the compartment 7. Inserted into the cylindrical compartment 7 is a tube 12 which in the region of the opening 9, is in the form of a half-tube 13. The tube 12 is integrated into a closure cover 14 for both receptacles 2 and 4. The closure cover 14 comprises a pouring opening 15 for an opening 16 of the receptacle 2 and a pouring opening 17 for the tube 12. The cover 14 is rotatable about the axis 18 of the tube 12. A handle 20 is located on one side 19 of the receptacle 2.

Figure 3:
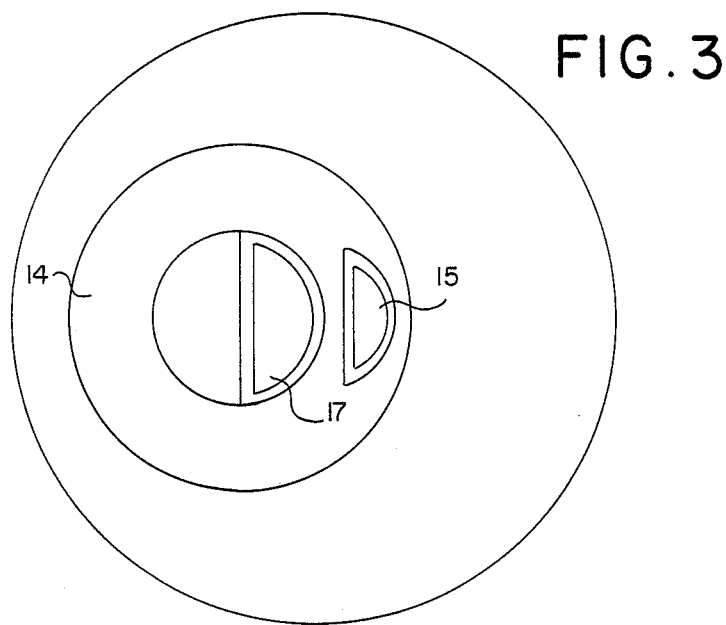
FIG. 3 shows the corresponding position of the cover in the closed position.

The mode of operation of the invention will now be described. Before use, the appliance 1 is initially used for separately storing the liquid substance 3 in the receptacle 2, and the pourable substance 5 in the compartment 6 of the receptacle 4. This storage position is shown in FIGS. 2 and 3. The cover 14 is in the closed position. In this position, the opening 16 of the receptacle 2 is closed by the cover 14, while the opening 9 in the partition 8 between the two compartments 6 and 7 is closed by that part of the tube 12 which is in the form of a half-tube 13. In this position, the pouring openings 15 and 17 perform no function.

Figure 4:
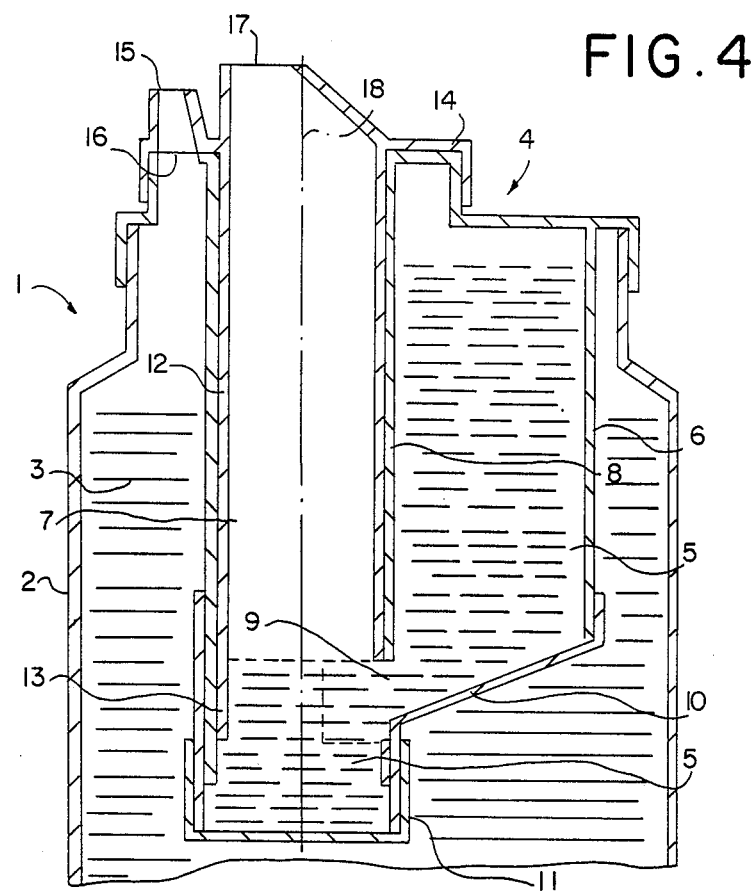
FIG. 4 is a sectional view of the embodiment of FIG. 1.
Figure 5:
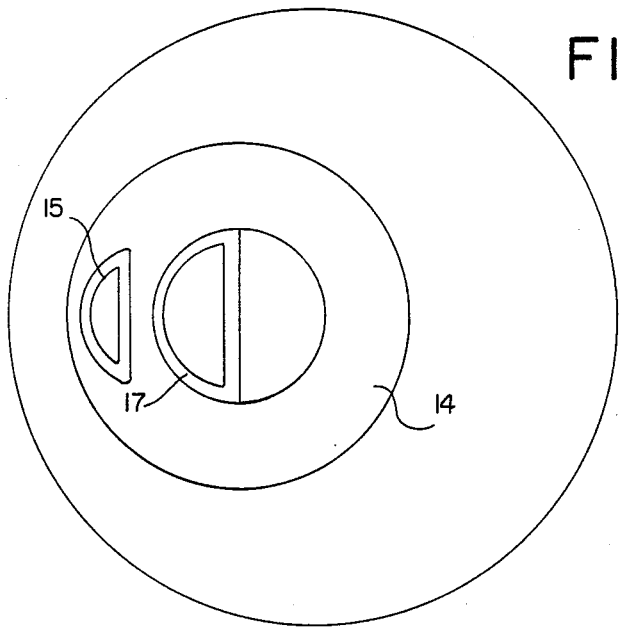
FIG. 5 shows the closure cover in the open position.

If appliance 1 is to be used, the closure cover 14 is turned through 180°, to the position shown in FIGS. 4 and 5. The opening 16 is thus released by the pouring opening 15. At the same time, that part of the tube 12 in the form of a half-tube 13 is situated on the side opposite the opening 9. The opening 9 in the partition 8 is thus released.

The pouring openings 15 and 17 face in the same direction. The pourable substance 5 trickles over the sloping base 10 through the opening 9 into the compartment 7. The slope of the base 10 and the size of the opening 9 determine the quantity of pourable substance 5.

Figure 6:
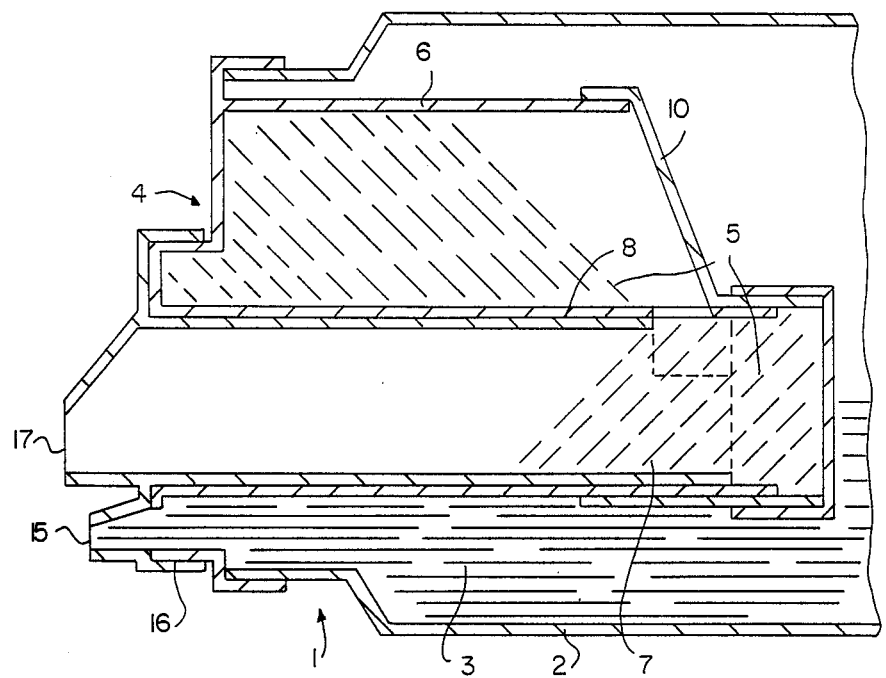
FIG. 6 is a sectional view at the beginning of the pouring process.
Figure 7:
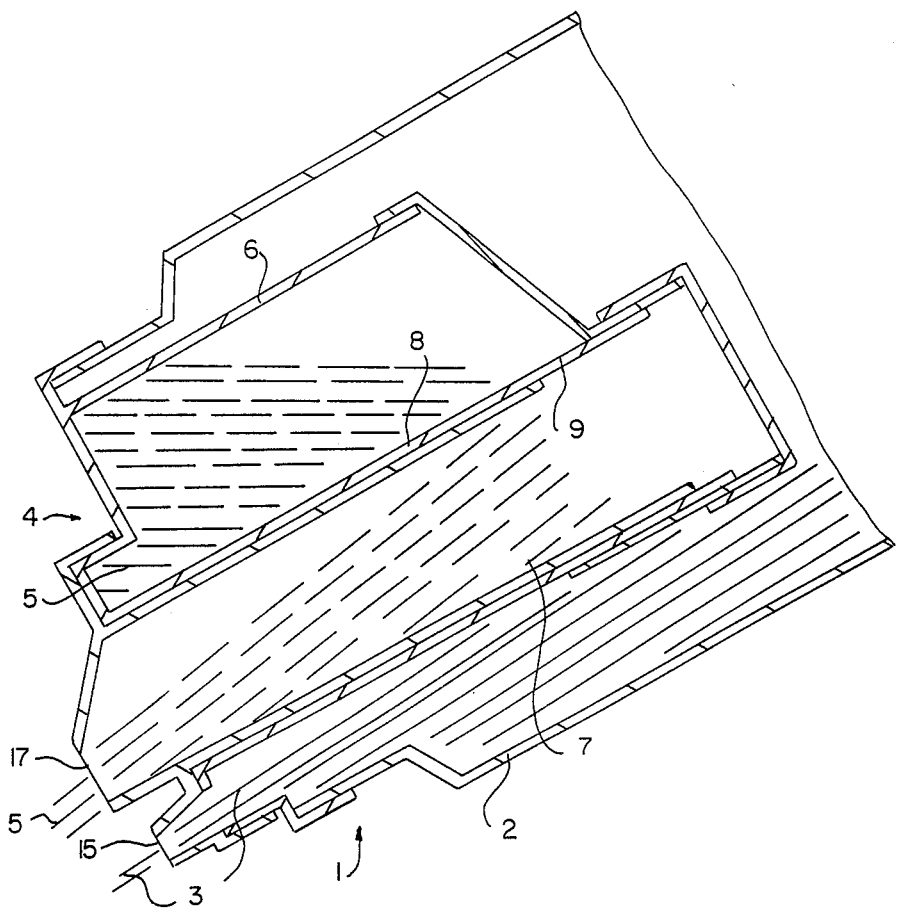
FIG. 7 is a sectional view showing the pouring process.

The actual pouring process is shown in FIGS. 6 and 7. First, the appliance 1 is brought into a horizontal position, as shown in FIG. 6. In this position, the liquid substance 3 begins to flow through the opening 16 and the pouring opening 15. At the same time, the pourable substance 5 in the compartment 7 trickles into that part of the compartment 6 which is situated above the opening 9 in the vertical position of the appliance 1, thereby preventing more pourable substance 5 from passing through the opening 9. If the appliance 1 is then turned some more (FIG. 7), the pourable substance 5 trickles through the compartment 7 out of the pouring opening 17. At the same time, the liquid substance 2 flows out.

When all the pourable substance 5 has left the compartment 7, the appliance 1 is moved back into its vertical starting position. The cover 14 is then turned through 180° again and brought into the position shown in FIG. 3. The opening 16 of the receptacle 2 and the opening 9 of the partition 8 between the two compartments 6 and 7 of the receptacle 4 are thus closed again. The appliance 1 is thus back in the storage position or condition.

The illustrated pouring process may be repeated as often as required until the appliance 1 is completely empty. In each pouring process, an exactly dosed quantity of pourable substance 5 issues from the appliance 1 together with a predetermined quantity of liquid substance 3. The ratio of pourable substance 5 to liquid substance 3 is established both by the size of the opening 9, and by the slope of the base 10 of the compartment 6. The opening cross-section of the opening 9 may be varied by additional mechanisms.

The appliance 1 may be refilled after emptying. To this end, the cover 14 is removed together with the tube 12. In addition, the receptacle 4 may be separated from the receptacle 2.

The invention is not limited to the embodiment shown by way of example in the drawings. Other embodiments of the invention are possible without departing from the basic concept. For example, instead of one receptacle for the liquid substance or the pourable substance, several receptacles may be provided.

What is claimed is:

1. An appliance including integral first and second receptacles for storing and substantially simultaneously dispensing through first and second pouring openings via tilting of said appliance to initiate a dispensing cycle, a free-flowing substance at a predetermined flow rate, and a pourable substance, respectively, wherein the improvement comprises dosing element means in said second receptacle for isolating and limiting to a predetermined quantity the pourable substance dispensed in each dispensing cycle, whereby immediately after the predetermined quantity of said pourable substance is dispensed said appliance is turned upright for terminating the flow of said free-flowing substance, thereby substantially obtaining a predetermined quantity and dose or mixture of said free-flowing and pourable substances.

2. The appliance of claim 1, wherein said second receptacle with said dosing element is designed for insertion into said receptacle for the free-flowing substance.

3. The appliance of claim 1, wherein said second receptacle with said dosing element means includes first and second compartments separated from one another by a partition including an opening therebetween, said dosing element means including means for selectively opening or closing off the opening in said partition, and said first compartment serving to hold said pourable substance.

4. The appliance of claim 3, wherein said first compartment includes a base which slopes downwards towards said partition and said second compartment, the latter serving as a pouring channel including a region extending beneath said base of said first compartment.

5. The appliance of claim 3, further including said dosing element means serving as a pouring channel being cylindrical in shape, the means for opening and closing the partition comprising a rotatable tube which is inserted into said second compartment, said tube being in the form of a half-tube in the region of the opening.

6. The appliance of claim 5, further including said tube integrated into a cover, the cover being provided with both said first pouring opening for opening into a top opening of said first receptacle, and with said second pouring opening for opening into a top opening of said second compartment of said second receptacle.

7. The appliance of claim 6, wherein said cover includes means for selectively turning said cover from a closed position blocking said first pouring opening, to a position in which said first opening opens into said first receptacle and said opening in said partition is open.

* * * * *